United States Patent
Pal et al.

(10) Patent No.: US 10,959,077 B2
(45) Date of Patent: *Mar. 23, 2021

(54) PREVENTIVE MAINTENANCE AND FAILURE CAUSE DETERMINATIONS IN TURBOMACHINERY

(71) Applicant: MachineSense, LLC, Baltimore, MD (US)

(72) Inventors: Biplab Pal, Ellicot City, MD (US); James Zinski, Ellicot City, MD (US)

(73) Assignee: MachineSense LLC, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,919

(22) Filed: Apr. 27, 2020

(65) Prior Publication Data
US 2020/0260247 A1    Aug. 13, 2020

Related U.S. Application Data

(63) Continuation of application No. 16/286,058, filed on Feb. 26, 2019, now Pat. No. 10,638,295, which is a continuation-in-part of application No. 15/816,613, filed on Nov. 17, 2017, now abandoned, which is a continuation of application No. 14/599,461, filed on Jan. 17, 2015, now Pat. No. 9,826,338.

(51) Int. Cl.
*H04W 4/80* (2018.01)
*G05B 23/02* (2006.01)
*G05B 19/418* (2006.01)

(52) U.S. Cl.
CPC .......... *H04W 4/80* (2018.02); *G05B 19/4185* (2013.01); *G05B 23/0272* (2013.01); *G05B 23/0283* (2013.01); *G05B 2219/31457* (2013.01); *Y02P 90/02* (2015.11); *Y02P 90/80* (2015.11)

(58) Field of Classification Search
CPC ........................ G05B 23/0283; G05B 23/0272
See application file for complete search history.

(56) References Cited

U.S. PATENT DOCUMENTS

| | | |
|---|---|---|
| 4,023,940 A | 5/1977 | Shultz |
| 4,131,011 A | 12/1978 | Ling |
| 5,150,289 A | 9/1992 | Badavas |

(Continued)

FOREIGN PATENT DOCUMENTS

| | | |
|---|---|---|
| CN | 201672991 | 12/2010 |
| CN | 102539911 A | 7/2012 |

(Continued)

OTHER PUBLICATIONS

International Search Report and Written Opinion for PCT Application No. PCT/US16/18820; dated Aug. 4, 2016.

(Continued)

*Primary Examiner* — Amar Movva
(74) *Attorney, Agent, or Firm* — Fox Rothschild LLP

(57) ABSTRACT

Predicting maintenance needs and analyzing preventative maintenance requirements in electrically powered turbomachinery with multi-parameter sensors and power quality sensors, both of the Fog-type, providing time domain output data and transforming data samples into the frequency domain to detect a root cause of failure of the machinery.

8 Claims, 3 Drawing Sheets

(56) References Cited

U.S. PATENT DOCUMENTS

| | | |
|---|---|---|
| 5,487,225 A | 1/1996 | Downie |
| 5,610,339 A | 3/1997 | Haseley et al. |
| 5,825,338 A | 10/1998 | Salmon et al. |
| 5,995,561 A | 11/1999 | Yamasaki et al. |
| 6,104,987 A | 8/2000 | Farnsworth |
| 6,289,606 B2 | 9/2001 | Gillette et al. |
| 6,330,525 B1 | 12/2001 | Hays |
| 6,405,108 B1 | 6/2002 | Patel et al. |
| 7,406,399 B2 | 7/2008 | Furem et al. |
| 7,882,394 B2 | 2/2011 | Hosek et al. |
| 7,938,935 B2 | 5/2011 | MacHattie et al. |
| 8,021,462 B2 | 9/2011 | Moretto |
| 8,094,034 B2 | 1/2012 | Patel et al. |
| 8,112,381 B2 | 2/2012 | Yuan et al. |
| 8,126,574 B2 | 2/2012 | Discenzo et al. |
| 8,150,340 B2 | 4/2012 | Albsmeier et al. |
| 8,334,784 B2 | 12/2012 | Patel et al. |
| 8,390,299 B2 | 3/2013 | Laepple et al. |
| 8,405,940 B2 | 3/2013 | Schweitzer, III et al. |
| 8,421,475 B2 | 4/2013 | Thiim |
| 8,433,443 B2 | 4/2013 | Hagerty et al. |
| 8,560,368 B1 | 10/2013 | Maity et al. |
| 8,571,904 B2 | 10/2013 | Guru et al. |
| 8,726,535 B2 | 5/2014 | Garrido et al. |
| 8,868,242 B2 | 10/2014 | Loutfi |
| 8,920,078 B2 | 12/2014 | Woolever |
| 9,052,216 B2 | 6/2015 | Kamel et al. |
| 9,062,536 B2 | 6/2015 | Fischer |
| 9,250,275 B2 | 2/2016 | Patel et al. |
| 9,781,243 B1 | 10/2017 | Huang |
| 10,041,844 B1 | 8/2018 | Brady |
| 10,638,295 B2* | 4/2020 | Pal .................... G05B 19/4185 |
| 2001/0038345 A1 | 11/2001 | Satoh et al. |
| 2002/0143421 A1 | 10/2002 | Wetzer |
| 2004/0102924 A1 | 5/2004 | Jarrell |
| 2004/0176926 A1 | 9/2004 | Edie |
| 2004/0199573 A1 | 10/2004 | Schwarz et al. |
| 2005/0049834 A1 | 3/2005 | Bottomfield |
| 2005/0222794 A1 | 10/2005 | Baird et al. |
| 2006/0137105 A1 | 6/2006 | Hong et al. |
| 2006/0168195 A1 | 7/2006 | Maturana et al. |
| 2006/0208169 A1 | 9/2006 | Breed et al. |
| 2006/0276949 A1 | 12/2006 | Beck et al. |
| 2007/0100518 A1 | 5/2007 | Cooper |
| 2007/0185685 A1 | 8/2007 | Lannes et al. |
| 2007/0193056 A1 | 8/2007 | Switalski |
| 2008/0103732 A1 | 5/2008 | Stoupis |
| 2008/0109185 A1 | 5/2008 | Cheung et al. |
| 2008/0289045 A1 | 11/2008 | Fryer |
| 2008/0294382 A1 | 11/2008 | Lim |
| 2009/0024359 A1 | 1/2009 | Bibelhausen et al. |
| 2009/0043518 A1 | 2/2009 | Roh et al. |
| 2009/0119243 A1 | 5/2009 | Yuan et al. |
| 2010/0023307 A1 | 1/2010 | Lee |
| 2010/0169030 A1 | 7/2010 | Parlos |
| 2010/0199352 A1 | 8/2010 | Hill et al. |
| 2010/0295692 A1 | 11/2010 | Bjorn |
| 2011/0016199 A1 | 1/2011 | De Carlo et al. |
| 2011/0131398 A1 | 6/2011 | Chaturvedi et al. |
| 2011/0137697 A1 | 6/2011 | Yedatore et al. |
| 2011/0216805 A1 | 9/2011 | Fernando et al. |
| 2011/0307220 A1 | 12/2011 | Lacaille |
| 2012/0045068 A1 | 2/2012 | Kim et al. |
| 2012/0166142 A1 | 6/2012 | Maeda et al. |
| 2012/0209569 A1 | 8/2012 | Becourt et al. |
| 2012/0213098 A1 | 8/2012 | Sun |
| 2012/0271576 A1 | 10/2012 | Kamel |
| 2012/0290104 A1 | 11/2012 | Holt et al. |
| 2012/0330499 A1 | 12/2012 | Scheid et al. |
| 2012/0330614 A1 | 12/2012 | Kar |
| 2013/0102284 A1 | 4/2013 | Storozuk |
| 2013/0119047 A1 | 5/2013 | Driussi |
| 2013/0170417 A1 | 7/2013 | Thomas et al. |
| 2013/0173178 A1 | 7/2013 | Poczka et al. |
| 2013/0201316 A1 | 8/2013 | Binder et al. |
| 2013/0268469 A1 | 10/2013 | Sharma et al. |
| 2013/0287060 A1 | 10/2013 | Langdoc et al. |
| 2013/0304677 A1 | 11/2013 | Gupta et al. |
| 2013/0318022 A1 | 11/2013 | Yadav et al. |
| 2014/0129164 A1 | 5/2014 | Gorbold |
| 2014/0132418 A1 | 5/2014 | Lill |
| 2014/0163416 A1 | 6/2014 | Shuck |
| 2014/0186215 A1 | 7/2014 | Shinta et al. |
| 2014/0207394 A1 | 7/2014 | Madden |
| 2014/0223767 A1 | 8/2014 | Arno |
| 2014/0244836 A1 | 8/2014 | Goel et al. |
| 2014/0262130 A1 | 9/2014 | Yenni |
| 2014/0309805 A1 | 10/2014 | Ricci |
| 2014/0314284 A1 | 10/2014 | Movellan et al. |
| 2014/0335480 A1 | 11/2014 | Asenjo et al. |
| 2014/0336791 A1 | 11/2014 | Asenjo et al. |
| 2014/0337429 A1 | 11/2014 | Asenjo et al. |
| 2015/0026044 A1 | 1/2015 | Refaeli |
| 2015/0039250 A1 | 2/2015 | Rank |
| 2015/0094914 A1 | 4/2015 | Abreu |
| 2015/0139817 A1 | 5/2015 | Kowalski |
| 2015/0181313 A1 | 6/2015 | Murphy |
| 2015/0185251 A1 | 7/2015 | Heydron et al. |
| 2015/0233792 A1 | 8/2015 | Gao |
| 2015/0233856 A1 | 8/2015 | Samuilov et al. |
| 2015/0247670 A1 | 9/2015 | Robertson et al. |
| 2015/0261215 A1 | 9/2015 | Blevins |
| 2016/0086285 A1 | 3/2016 | Jordan Peters et al. |
| 2016/0147205 A1 | 5/2016 | Kaufman |
| 2016/0189440 A1 | 6/2016 | Cattone |
| 2016/0209831 A1 | 7/2016 | Pal |
| 2016/0245279 A1 | 8/2016 | Pal et al. |
| 2016/0245686 A1 | 8/2016 | Pal et al. |
| 2016/0245765 A1 | 8/2016 | Pal |
| 2016/0291552 A1 | 10/2016 | Pal et al. |
| 2016/0299183 A1 | 10/2016 | Lee |
| 2016/0313216 A1 | 10/2016 | Pal et al. |
| 2016/0349305 A1 | 12/2016 | Pal |
| 2017/0006135 A1 | 1/2017 | Siebel |
| 2017/0032281 A1 | 2/2017 | Hsu |
| 2017/0060574 A1 | 3/2017 | Malladi et al. |
| 2017/0061608 A1 | 3/2017 | Kim et al. |
| 2017/0163444 A1 | 6/2017 | McLaughlin et al. |
| 2017/0201585 A1 | 7/2017 | Doraiswamy et al. |

FOREIGN PATENT DOCUMENTS

| | | |
|---|---|---|
| CN | 103399486 A | 11/2013 |
| CN | 203362223 U | 12/2013 |
| CN | 203588054 U | 5/2014 |
| CN | 104036614 A | 9/2014 |
| EP | 1836576 B1 | 2/2012 |
| EP | 2186613 B1 | 5/2013 |
| EP | 2648393 A1 | 10/2013 |
| WO | WO 2005/086760 A2 | 9/2005 |
| WO | WO 2010/104735 A1 | 9/2010 |
| WO | WO 2013/040855 A1 | 3/2013 |
| WO | WO 2013-041440 A1 | 3/2013 |
| WO | WO 2013/093942 A2 | 6/2013 |
| WO | WO 2014/044906 A1 | 3/2014 |
| WO | WO 2014/085648 A1 | 6/2014 |
| WO | WO 2014/089567 A2 | 6/2014 |
| WO | WO 2014/117245 A1 | 8/2014 |
| WO | WO 2015/022036 A1 | 2/2015 |
| WO | WO 2016/137848 A1 | 9/2016 |
| WO | WO 2017-1234525 A1 | 7/2017 |

OTHER PUBLICATIONS

International Search Report and Written Opinion for PCT Application No. PCT/US15/066547; dated Mar. 17, 2016.

Sensors Drive Mobile IoT; Wong, William; Jan. 26, 2015; Electronic Design.

International Search Report and Written Opinion for PCT Application No. PCT/US16/028724; dated Aug. 22, 2016.

International Search Report and Written Opinion for PCT Application No. PCT/US16/18831; dated Aug. 12, 2016.

(56) References Cited

OTHER PUBLICATIONS

Fault Detection in Kerman Combined Cycle Power Plant Boilers by Means of Support Vector Machine Classifier Algorithms and PCA by M. Berahman, et al., 3rd International Conference on Control, Instrumentation, and Automation (ICCIA 2013), Dec. 28-30, 2013, Tehran, Iran.
Fault Monitoring and Diagnosis of Induction Machines Based on Harmonic Wavelet Transform and Wavelet neural Network by Qianjin Guo, et al., dated Sep. 2008, published at the Fourth International Conference on Natural Computation.
Fault Diagnosis Method Study in Roller Bearing Based on Wavelet Transform and Stacked Auto-encoder, by Junbo Tan, et al., dated Feb. 2015, published by IEEE.
A Diagnostic Expert System Embedded in a Portable Vibration Analysis Instrument by Dr. Robert Milne, et al., dated May 13, 1991, published at IEE Colloquium on Intelligent Instrumentation.
Detection of Precursor Wear Debris in Lubrication Systems by Jack Edmonds, et al., dated May 2000, published by IEEE.
Fault Diagnosis of Bearing Based on Fuzzy Support Vector Machine, by Haodong Ma, et al., dated Jan. 2015, published by IEEE.
Investigation of the Mechanical Faults Classification using Support Vector Machine Approach by Zhiqiang Jiang, et al., dated Aug. 2010, 2010 Second International Conference on Intelligent Human-Machine Systems and Cybernetics.
Impact Characterization of Multiple-Points-Defect on Machine Fault Diagnosis by Muhammad F. Yaqub, et al., 8th IEEE International Conference on Automation Science and Engineering, Aug. 20-24, 2012, Seoul, Korea.
Detection of Generalized-Roughness Bearing Fault by Spectral-Kurtosis Energy of Vibration or Current Signals by Fabio Immovilli, et al., IEEE Transations on Industrial Electronics, vol. 56, No. 11, Nov. 2009.
Intrinsic Mode Function Determination of Faulty Rolling Element Bearing Based on Kurtosis by Wei Kang, et al., Proceeding of the 2015 IEEE International Conference on Information and Automation, Lijiang, China, Aug. 2015.
Condition Monitoring and Fault Diagnosis of Rolling Element Bearings Based on Wavelet Energy Entropy and SOM by Shuai Shi, et al., dated Aug. 2012, published by IEEE.
Continuous Hidden Markov Model Based Gear Fault Diagnosis and Incipient Fault Detection by Jian-She Kang, et al., dated Jun. 2011, published by Institute of Electrical and Electronics Engineers (IEEE).
Study on Fault Diagnosis of Gear with Spall using Ferrography and Vibration Analysis by Wei Feng, et al., published in Aug. 2009 at the International Conference on Measuring Technology and Mechatronics Automation.
International Search Report and Written Opinion for PCT Application No. PCT/US2016/067814; dated Apr. 6, 2017.
International Search Report and Written Opinion for PCT Application No. PCT/US2016/067546; dated Apr. 11, 2017.
Krishnamurthy, S. et al. (2008) Automation of Facility Management Processes Using Machine-to-Machine Technologies. In: Floerkemeier C., Langheinrich M., Fleisch E., Mattern F., Sarma S.E. (eds) The Internet of Things. Lecture Notes in Computer Science, vol. 4952. DOI:10.1007/978-3-540-78731-0_5 (Year: 2008).
Holler, J. et al. (2014). "From Machine-to-machine to the Internet of Things: Introduction to a New Age of Intelligence." Chapters 2, 4, 5, 7, 10, 12. Academic Press. DOI:10.1016/13978-0-12-407684-6.00002-4 (Year: 2014).
Azure IoT Edge open for developers to build for the intelligent edge, George, Sam; Azure Internet of Things; Nov. 15, 2017.
Predix Edge Technology Product Brief, General Electric, 2017.
http://ieeexplore.ieee.org/document/8089336/ Future Edge Cloud and Edge Computing for Internet of Things Applications-Janali Pan et al.
Challenges and Solutions of Protecting Variable Speed Drive Motors; Aversa, et al.; Feb. 11, 2013; Presented at the 2013 Texas A&M Conference for Protective Relay Engineers.
Dec. 21, 2018 Non-Final Office Action against Applicant's co-pending U.S. Appl. No. 14/833,111.
Vasudevan, Shobha, "Still a Fight to Get It Right: Verification in the Era of Machine Learning", 2017 IEEE International Conference on Rebooting Computing (ICRC), Washington, DC, 2017, pp. 1-8. (Year: 2017).

\* cited by examiner

PREVENTIVE MAINTENANCE AND FAILURE CAUSE DETERMINATIONS IN TURBOMACHINERY

CROSS-REFERENCE TO RELATED PATENT APPLICATIONS

This patent application is a 35 USC 120 continuation of and claims the benefit of the priority from co-pending U.S. patent application Ser. No. 16/286,058 entitled Systems and Method for Turbomachinery Preventive Maintenance and Root Cause Failure Determination, filed 26 Feb. 2019 by MachineSense LLC as Applicant, naming Biplab Pal and James Zinski as inventors, issued 28 Apr. 2020 as U.S. patent Ser. No. 10,638,295.

The '058 patent application was a 35 USC 120 continuation-in-part of U.S. patent application Ser. No. 15/816,613 entitled "Predicting Dryer Maintenance Using Machine Wearables, filed 17 Nov. 2017 and published 15 Mar. 2018 as US 2018/0077522 A1.

The '613 application was a 35 USC 120 continuation of U.S. patent application Ser. No. 14/599,461, filed 17 Jan. 2015, published 21 Jan. 2016 as US 2016/0209831 A1, issued as U.S. Pat. No. 9,826,338 on 21 Nov. 2017.

This patent application claims the benefit of the priority of the '613 application through the '058 application and, through the '613 application, claims the benefit of the priority of the '461 application, both under 35 USC 120.

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

Description of the "Cloud" and "Edge Cloud" Prior Art

The term "cloud" has become familiar not only to data processing professionals but also to anyone familiar with computer technology on anything more than a casual basis. The so-called "cloud," sometimes referred to herein as the "public cloud," is made up of more than 10,000 data centers scattered over the world and loosely connected together by the Internet. In the next five years, driven by the need to get data, solutions and applications closer to the user, hundreds of thousands of scaled-down data centers are expected to sprout up at the edge of the Internet network, to form what is sometimes collectively called the "edge cloud". Accordingly, edge cloud computing means computing that makes use of or is performed wholly or partially in such scaled-down data centers, or even in a single small factory have computing and Internet connection capabilities. All of these collectively define the "edge cloud".

In today's networked world, data centers run by large entities such as Amazon, Google, Equinox, DRT, and the like are interconnected and stream data, information, and applications, namely software, over the Internet to end users. Large providers of content lease capacity in data centers or operate their own data centers. Global operations such as Amazon have one, two, or more data centers per continent. These large data centers may be considered to sit at the virtual center of the cloud, meaning they are all well removed, distance wise, from the end users.

There is burgeoning activity involving applications and content, which activities include streaming video to mobile devices, "wait-and-see" sensitive Internet computing, data, software, applications, and security filters, all needing to be pushed to the Internet network, namely closer to the edge of the Internet network and therefore closer to the user, in order that these applications, data, software, etc., may be accessed quickly and may provide their data, information, results, etc., faster to their Internet users. This shift to "edge cloud computing" is necessitated by a number of factors, with latency, namely the delay before a transfer of data begins following an instruction for its transfer, being the most often cited reason.

Accordingly, growth of the edge cloud is driven by the need to get data and applications closer to users. Hence, the edge cloud, in the broadest sense, is composed of orders of magnitude of data centers, each desirably being scaled down and each desirably being a short distance from the relevant end user. The rationale for the edge cloud is that if an application runs on a processor at a location closer to the user, latency is reduced as the data traverses a shorter segment of the Internet network, thereby ultimately reducing the resources required. By contrast, when compared to the conventional centralized data center world, in a major metropolitan area when information, data, etc., travels from a data center to the end user, the information, data, etc., might have to go through many routers and run over thousands of miles of fiber optics on its journey to the end user. As a result the transport costs and potentials for delay are considerable. The edge cloud approaches minimizes if not eliminates these delays and associated risks, and reduces costs.

TECHNOLOGICAL BACKGROUND

Recently there has been increased commercial as well as academic interest in the area of so called "condition based" machine maintenance.[1,2,3] Effective solutions to machine maintenance can eliminate causes of machine downtime caused by abrupt failures of components. Predictive maintenance can, to some extent, eliminate abrupt downtimes but, unless the root cause of the failure is discovered and eliminated, predictive maintenance does not adequately address the failure of machine replacement parts, which fail randomly.

[1] IEEE TRANSACTIONS ON ENERGY CONVERSION, VOL. 20, NO. 4, DECEMBER 2005 719 Condition Monitoring and Fault Diagnosis of Electrical Motors—A Review
[2] Signal Processing, Communication, Power and Embedded System (SCOPES), 2016 International Conference: Condition monitoring of induction motors:—A review
[3] U.S. Pat. No. 6,738,748 B2

It is generally accepted that there are two major root causes of early machine failures. One of these causes is improper operation, for example, operating a machine without changing an oil or air filter, oil, lubricating grease, and the like, which may lead to abnormal vibration. Similarly, bad operation embraces instances where a machine is made to work beyond its specified maximum speed or loading, or in temperatures above those for which the machine was designed to operate, or with voltage or current outside of the machine's design requirements.

A second major cause of early machine failure is poor quality of incoming electrical power. In the case of three-phase electrical power, such poor quality can be manifested by high phase imbalance of both current and voltage, presence of higher harmonics of both current and voltage, and low noise ratio typically due to poor grounding. Any such poor quality parameters present in the power provided to a machine accelerates failure of motor stators and rotor bearings due to excessive thermal and electrical stresses.

Some investigators have endeavored to understand the predictive nature of machine failures, especially for turbomachinery, namely machinery having rotating elements, such as vacuum pumps, jet engines, electrical generators, electric motors, and the like.

Elimination of the root cause of failures of these machines using predictive engines, built from predictive, preventive, and root cause discovery of vibration and power analysis, using machine wearable sensors, has not been effectively developed heretofore.[4,5,6] There has been some study of root cause of failures caused by poor electrical power quality. The effect of higher harmonics and phase imbalance of both current and voltage on machine health has been subject to some academic and commercial research, but actively correlating the root causes of machine degradation, namely bearing or shaft misalignment in a turbomachine, with power quality, has not been effectively studied and is not widely understood. [7,8,9]

[4] Harmonics and Quality of Power, 2000. Proceedings. Ninth International Conference on: Induction motors loss of life due to voltage imbalance and harmonics: a preliminary study
[5] Electrical Machines (ICEM), 2014 International Conference: Evolution of high order fault harmonics during a bar breakage with compensation
[6] Systems, Signal Processing and their Applications (WoSSPA), 2013 8th International Workshop: Fault detection and diagnosis in rotating machinery by vibration monitoring using FFT and Wavelet techniques
[7] Harmonics and Quality of Power, 2000. Proceedings. Ninth International Conference on: Induction motors loss of life due to voltage imbalance and harmonics: a preliminary study
[8] Electrical Machines (ICEM), 2014 International Conference: Evolution of high order fault harmonics during a bar breakage with compensation
[9] Systems, Signal Processing and their Applications (WoSSPA), 2013 8th International Workshop: Fault detection and diagnosis in rotating machinery by vibration monitoring using FFT and Wavelet techniques In factories, direct current and vector current drives generate alarming levels of high harmonics throughout the electrical power distribution line unless filtered by isolators or harmonic filters.[10] Even if an Internet of Things based predictive or condition based maintenance system is present in a factory with turbomachinery, motors continue to degrade at an accelerated pace until the root cause of the harmonics is found and eliminated. Predictive maintenance can, at best, help to avoid abrupt breakdowns but cannot address the issue of reduced lifespan of turbomachines resulting from faster degeneration of motor cores burned by higher harmonics generated from DC and vector current voltage drives.

[10] Protective Relay Engineers, 2013 66th Annual Conference: Challenges and solutions of protecting variable speed drive motors Since electrical line issues tend to be local and transient, and effect only the machines connected to the same line or to the same electrical distribution panel, it is important that predictive maintenance data obtained from a machine and electrical line conditions be correlated in a local server so that latency in receiving them does not hamper effective and quick decision making. For this reason, effective computation is done in an edge device, sometimes also called a fog device and in an edge cloud, which is a mini-server connected to the same net as a fog device.

SUMMARY OF THE INVENTION

In one of its aspects, this invention provides a method for providing predictive and preventive maintenance and determination of root cause(s) of failure for electrically powered turbomachinery. The method commences by sensing physical parameters in the course of operation of a machine of interest where those physical parameters include motor speed, vibration, magnetic field presence and strength, temperature, relative humidity, infrared radiation, input voltage, input current and phase parameters of input power. The invention proceeds by providing a time domain output collection of data indicative of the sensed physical parameters of interest with the data being desirably provided to first and second parallel processing blocks.

The invention further proceeds by processing the time domain output data in the second processing block by selecting a parameter data sample, transforming the data sample into the frequency domain by performing Fourier transformation thereon, and extracting metadata for selected characteristics of the sensed physical parameters from the transformed data. The invention also proceeds by continuously monitoring the time domain data and performing trend analysis thereon for selected ones of the parameter characteristics. This aspect of the invention further proceeds upon detecting deviation of a selected characteristic in the time domain data from a pre-selected value, by sampling the frequency domain metadata for pre-selected time interval and then analyzing the frequency domain selected parameter characteristic according to a pre-selected algorithm relative to a base value to detect the root cause of any variation of the parameter from the base value.

In another aspect the invention provides a system for providing predictive and preventive maintenance and root cause of failure determination for electrically powered turbomachinery where the system includes a sensor device connected to an electric motor powering the turbomachinery for sensing physical parameters including at least one of motor speed, vibration, magnetic field presence and strength, temperature, relative humidity, infrared radiation, input voltage, input current and phase parameters of input power and providing time domain output data indicative of the sensed physical parameters.

The invention further includes a communication network connected to the sensor device for receiving the output data therefrom. In this aspect of the invention, the invention further includes a first computing device connected to the communication network for receiving the output time domain data therefrom. The first computing device preferably has first and second parallel processing blocks, each receiving time domain sensed data from the network. The second processing block is preferably provided to process the time domain data by selecting a vibration sample size and time duration to be within the processing capacity of the first computing device, transforming the data into the frequency domain by performing Fourier transformation thereon, and extracting metadata for selected characteristics of the sensed parameters from the transformed data.

In this aspect of the invention, the system preferably further includes an edge cloud computing device connected to the first computing device by the communication network. The edge cloud computing device receives from the first processing block time domain data for analysis thereof and receives from the second processing block frequency domain data extracted from the transformed time domain data. The edge cloud computing device uses this data for continuously monitoring and performing trend analysis on the time domain data for selected parameter characteristics. Upon detecting deviation of the selected characteristic in the time domain data from a pre-selected value, the edge cloud device proceeds with sampling the frequency domain metadata for a preselected time interval, and then analyzing the selected parameter characteristic according to a pre-selected algorithm relative to a base value to determine the root cause of any variation of the parameter from the base value as a marker of a root cause of failure.

In still another one of its aspects, the invention provides a system providing predictive and preventive maintenance and root cause of failure determination for electrically powered turbomachinery where the system includes at least one vibration sensor connected to an electric motor powering the turbomachinery and providing time domain output data indicative of sensed vibration parameters. In this aspect of the invention, the system further provides a communication network connected to the sensors for receiving the output data therefrom.

The system further includes a first computing device connected to the communication network for receiving the output data therefrom. The first computing device has first and second parallel processing blocks each receiving the time domain data from the network. The second processing block is provided for processing the time domain data by selecting a data sample of pre-selected size and duration, transforming the data into the frequency domain by performing Fourier transformation thereon, and extracting metadata for selected vibration parameters from the transformed data. The system in this aspect of the invention further includes an edge cloud computing device connected to the first computing device by the communication network. The edge cloud computing device receives from the first processing block time domain data for analysis thereof and receives from the second processing block frequency domain metadata extracted from the transformed data. The edge cloud computing device uses the data for continuously monitoring and performing trend analysis on the time domain data for selected characteristics indicative of status of vibration parameters. Upon detecting variance in the selected characteristic in the time domain data from a pre-selected value, the edge cloud computing device samples the frequency domain metadata for a pre-selected time interval and analyzes the sampled frequency domain metadata for the selected characteristics according to a pre-selected algorithm relative to base values of the characteristics in order to detect root causes of any deviations of the characteristics from the base values as a marker for a root cause of failure.

The following detailed description is exemplary in nature and is not intended to limit the described embodiments of the invention or uses of the described embodiments. As used herein, the words "exemplary" and "illustrative" mean "serving as an example," "for instance," or "for illustration." Any implementation or embodiment or abstract idea disclosed herein as being "exemplary" or "illustrative" is not necessarily to be construed as preferred or advantageous over other implementations, aspects, or embodiments. All of the implementations or embodiments described in the detailed description are exemplary implementations and embodiments provided to enable persons of skill in the art to make and to use the implementations and embodiments as disclosed below, and to otherwise practice the invention, and are not intended to limit the scope of the invention, which is defined by the claims.

Furthermore, by this disclosure, there is no intention on the part of the Applicant to be bound by any express or implied theory presented in the preceding materials, including but not limited to this Summary of the Invention or the Description of the Prior Art, or in the following Description of the Invention. It is to be understood that the specific implementations, devices, processes, aspects, and the like illustrated in the attached drawings and described heretofore and in the following portion of the application, are simply exemplary embodiments of the inventive concepts defined in the claims. Accordingly, specific dimensions and other physical characteristics relating to the embodiments disclosed herein are not to be considered as limiting as respecting the invention unless the claims or the specification expressly state otherwise.

DESCRIPTION OF THE INVENTION

The term "Fog" is well known and used widely in the literature[11]. The term is used in this application consistent with its meaning in the literature and denotes a device in which a minicomputer is attached to a sensor where the sensor is capable of receiving data representing values of various parameters in the physical sciences such as voltage, temperature, current, frequency, and the like. Hence, the term "Fog device" denotes a physical parameter sensor attached to a minicomputer.

[11] Fog Computing and the Internet of Things: Extend the Cloud to Where the Things Are: CISCO White Paper: https://www.cisco.com/c/dam/en us/solutions/trends/iot/docs/connputing-overview.pdf This invention provides systems and methods that produces predictive and preventive maintenance information and root cause of failure information for electrically powered turbomachinery. The system, in one of its embodiments, includes a sensor device connected to an electric motor powering turbomachinery. See block 1 in FIG. 1 as representative. The sensor device sense values of physical parameters preferably including at least one of motor speed, vibration, magnetic field, presence and strength, temperature, relative humidity, infrared radiation, input voltage, input current and phase parameters of the input electrical power. The sensor device provides output data indicative of the sensed values of these physical parameters. In a preferred embodiment of the system aspect of the invention the system further includes a communication network connected to the sensor device, for receiving the output "parameter" data from the sensor device.

Connected to the communication network, preferably wirelessly, is a first computing device receiving the output "parameter" data from the communication network. The computing device preferably includes at least first and second parallel processing blocks. See blocks 2 and 3 in FIG. 1 as representative. Each processing block receives time domain sensed "parameter" data from the communication network. One processing block processes the time domain parameter data by initially selecting a parameter data sample size and duration to be within the processing capacity of the first computing device, such as Fog Device-2 in FIG. 1. The first computing device then transforms the data into the frequency domain by performing Fourier transformation thereon. Thereafter the first computing devices extracts metadata for selected characteristic(s) of the sensed parameter(s) from the transformed data.

Figure 1:
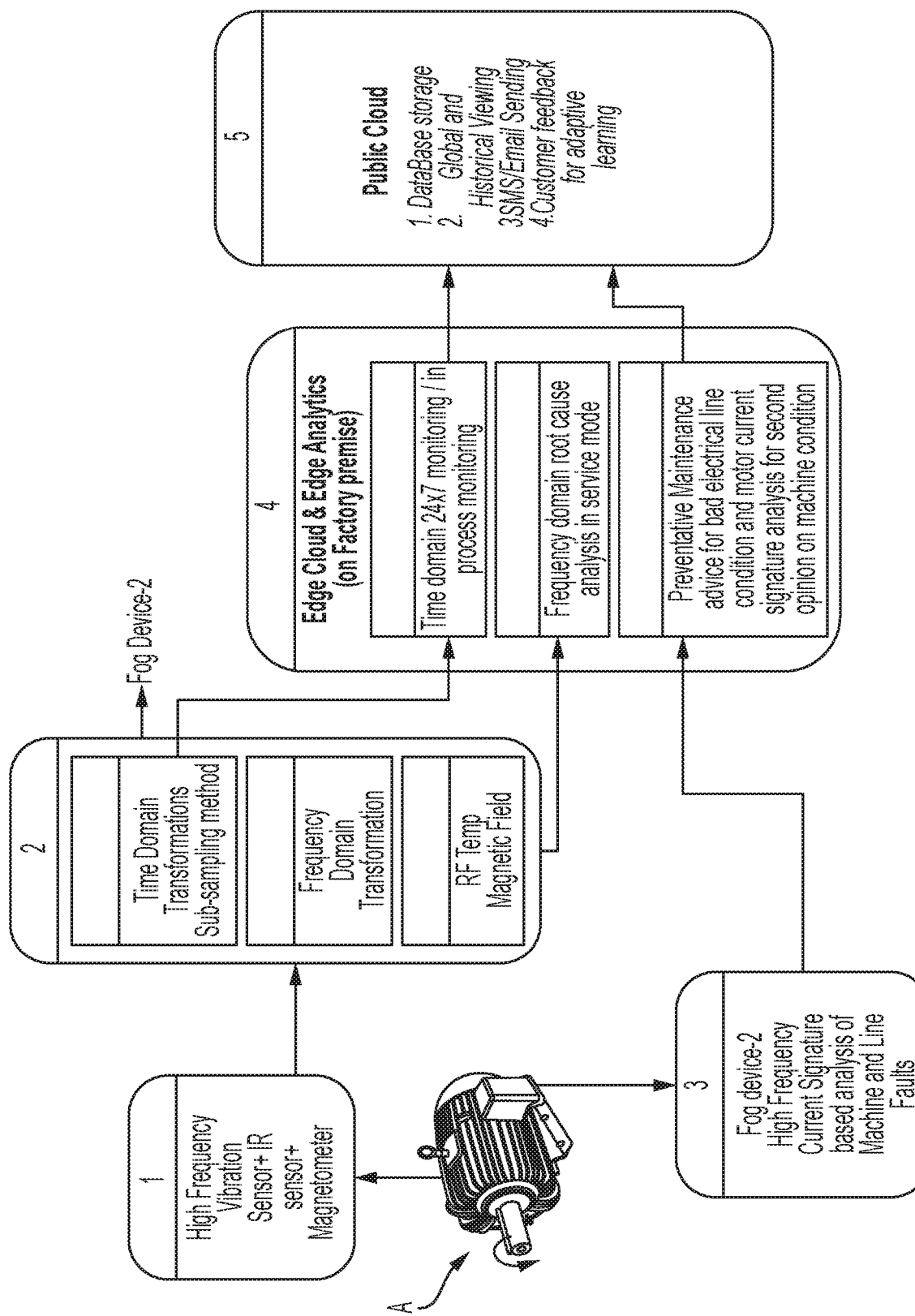
FIG. 1 is a schematic representation of a system for determining root causes of turbo machinery failures in accordance with aspects of the invention.

In this embodiment the system further includes an edge cloud computing device, as represented by block 4 in FIG. 1, connected to the first computing device by the communication network. The edge cloud computing device receives from one processing block of the first computing device time domain data for analysis thereof.

The communication network may be wired, or may be wireless such as Bluetooth, or even be over the Internet. Wireless is preferred. The communication network is depicted schematically by the arrowed lines in FIG. 1 connecting blocks 1, 2, 3, and 4. The edge cloud computing device further receives from a second processing block frequency domain metadata extracted from transformed time domain data.

As depicted schematically in block 4, using the time domain data, the edge cloud computing device continuously monitors and performs trend analysis on the time domain data for selected characteristics of the parameters of interest. Upon the edge cloud device detecting deviation, of a selected parameter characteristic of interest in the time domain data (namely deviation from a preselected characteristic value for the parameter), the edge cloud computing device samples the frequency domain metadata for a preselected time interval and then analyzes the selected parameter characteristic value data in the frequency domain, according to a preselected algorithm related to a predetermined, preselected base value of the parameter, to determine the root cause of any variation of the selected parameter value from the base value. Such variation of the parameter value from the base value indicates a root cause of failure of the turbomachine the system analyzed.

The invention also provides, in another one of its aspects, a method for furnishing predictive and preventive maintenance information, and root cause of failure information for electrically powered turbomachinery. The method includes sensing values of physical parameters in the course of operation of the electrically powered turbomachinery where the parameters include at least one of motor speed, vibration, magnetic field presence and strength, temperature, relative humidity, infrared radiation, input voltage, input current and phase parameter(s) of the input electrical power, all as indicated by blocks 1 and 3 in FIG. 1.

The method proceeds by providing time domain output data indicative of the sensed values of the selected physical parameters to two parallel processing blocks of a computing device, as indicated schematically by blocks 2 and 3 in FIG. 1. The method further proceeds by processing the time domain output data in one of the processing blocks by selecting a parameter data sample, transforming the data sample into the frequency domain by performing Fourier transformation thereon, and extracting metadata for sensed values of the selected characteristics of the physical parameters, from the transformed data, with all of this being done in the frequency domain, as indicated schematically by block 2 in FIG. 1.

The method then proceeds with continuously monitoring the time domain parameter value data and performing trend analysis thereon for selected parameter characteristics. The method yet further proceeds, upon detecting deviation in value of a selected characteristic in the time domain data from a preselected value, sampling the frequency domain metadata for a preselected time interval (preferably while the time domain data of interest was received) and then analyzing in the frequency domain selected parameter characteristics values according to a preselected algorithm relative to a base value to detect the root cause of any variation of the parameter from the base value. These steps of the method are preferably performed by and in the edge cloud computing device and are schematically illustrated by block 4 in FIG. 1.

In an even more limited and specific application, the invention provides a system providing predictive and preventive maintenance data and root cause of failure information for electrically powered turbomachinery where the system includes a vibration sensor connected to an electric motor powering the turbomachine with the sensor providing time domain output data indicative of at least one sensed vibration parameter(s). This is depicted in a limited sense by blocks 1 and 3 in FIG. 1. The system further includes a communication network, depicted schematically by the arrowed lines in FIG. 1, connected to the sensor for receiving the time domain output vibration data. Yet further included, as a portion of the system, is a first computing device connected to the communication network for receiving the output vibration data therefrom. The first computing device preferably has two parallel processing blocks, each receiving time domain vibration data from the network. The two processing blocks may be considered as represented by blocks 2 and 3 in FIG. 1. One block processes the time domain data by selecting a data sample of preselected size and duration, transforming the data into the frequency domain by performing Fourier transformation thereon, and extracting metadata for selected vibration parameter(s) from the transformed data.

The system yet further includes an edge cloud computing device connected to the first computing device via the communication network. The edge cloud computing device receives the time domain vibration data from the remaining processing block for analysis thereof. The edge cloud computing device further receives the frequency domain metadata from the processing block that performed the Fourier transformation from the time domain to the frequency domain; the metadata is that which had been extracted from the transformed time domain vibration data. The edge cloud computing device is represented by block 4 in FIG. 1. The edge cloud computing device takes this time domain and frequency domain data and continuously monitors and performs trend analysis on the time domain data for selected characteristics indicative of the vibration parameter value or parameters values then sensed by the sensor.

Upon detecting values that are variants of the selected characteristics in the time domain data from a preselected value, the edge cloud computing device samples the frequency domain metadata for a preselected time interval, desirably from within which the time domain data was harvested. The edge cloud computing device then analyzes the sampled frequency domain metadata for the selected characteristics according to one or more preselected algorithms relative to base values of the vibration characteristic(s) to detect of any deviation(s) of the characteristic(s) from the base values thereby identifying root cause(s) of failure of the turbomachine.

Referring further to the drawings, FIG. 1 illustrates an embodiment of a system in accordance with the invention in which a power analyzer and a multi-sensor are connected to an electric motor driving a turbomachine. The multi-sensor is preferably physically attached to the motor while the power analyzer is preferably connected to an electrical line providing electrical power to the motor. The power analyzer analyzes incoming three phase current and voltage supplied to the motor. A high frequency vibration sensor is part of the multi-sensor (which also has a magnetic sensor and an infrared sensor), is mounted on the motor body, and extracts high frequency vibration data from the motor. This is denoted by block 1 in FIG. 1. The high frequency data is then processed by two parallel blocks, represented by blocks 2 and 3 in FIG. 1.

The two parallel data collection and computing devices represented by blocks 2 and 3 in FIG. 1 are preferably embodied together in a single board computer or other data processing device.

In one of the blocks, specifically block 3, data is processed in the frequency domain by selecting a limited number of samples, of size and duration to match the fast Fourier transform processing capability of the selected, preferably single board, computer. A portion of the preferable single board computer is represented by block 2 in FIG. 1. In block 2 metadata of features, such as harmonics, full width at half maximum amplitude, crest factor, skewness, and other parameters of the electric power supplied to the motor of the turbomachine, are extracted from the fast Fourier transformed data and are sent to an edge cloud computing device, as indicated by block 4 in FIG. 1.

Time domain data, received from one or more sensors mounted on the motor depicted schematically in FIG. 1, are transmitted to block 3 which, as indicated in FIG. 1, receives the data from the Fog device which provides a single, preferably high frequency current, signature based on analysis of machine performance and electric line input power characteristics. This time domain data is in turn sent to an edge cloud device, indicated by block 4, as shown by the arrows connecting block 3 with block 4 in FIG. 1.

Block 2 depicts metadata of characteristics of the parameter data, such as harmonics and full width at half maximum amplitude, being extracted from the fast Fourier transformed data and sent to the edge cloud device represented by block 4 in FIG. 1.

In the edge cloud device represented by block 4 in FIG. 1, both the metadata from the frequency domain analysis, resulting from the frequency domain data transformation in block 2, and the time domain data received from block 3, are analyzed. Receipt of the data by the edge cloud device is indicated by the arrows connecting block 2 and block 3 with block 4. In the edge cloud device a time domain subsampling method is preferably performed, providing 24×7 monitoring of health of the motor from the time domain vibration data. The subsampling determines whether there is any degradation in health of the motor via trend analysis of the time domain vibration data, using parameters such as crest factor and skewness of the vibration data.

All of this is performed in the edge cloud device, which is preferably on the premises of the installation at which the turbomachine of interest is located. If an alert indicating degradation of turbomachine health is detected from the time domain data, preferably only then are the fast Fourier transform based analysis methods initiated. This analysis most preferably takes place within the edge cloud device. Any delay or selectivity in initiating the fast Fourier transfer method analysis is because it is largely impossible to carry out continuous fast Fourier transforms on all of the samples of data received when the sampling rate of data received from a turbomachine may exceed 1,000 samples per second.

Due to limitations of the Fog device(s), the edge cloud computing device may only be capable of providing fast Fourier transformation of 1,000 samples of vibration data at a given time, which transformation might be completed in a selected ten minute period during turbomachine down time or over a contemporaneous ten minute period during operation of the turbomachinery. Since the fast Fourier data transfer operation may take a few seconds in a resource constrained Fog device, such as that indicated as Fog Device-2 in FIG. 1, if a fast Fourier transform based diagnosis is enabled and is to be performed in the edge cloud computing device, frequency domain analysis may have to be paused or even delayed, until the Fog Device-2 can "catch up" in supplying data.

FIG. 1 further illustrates the edge cloud device interacting with the public cloud, represented by block 5, with the public cloud providing database storage functions and allowing global and historical viewing of data. The public cloud also provides the basis for SMS or email transmittal of the results of the edge cloud analyses. The public cloud may further provide a database for customer feedback and/or for adaptive learning based on the data and computations performed by the edge cloud device indicated by block 4.

Figure 2:
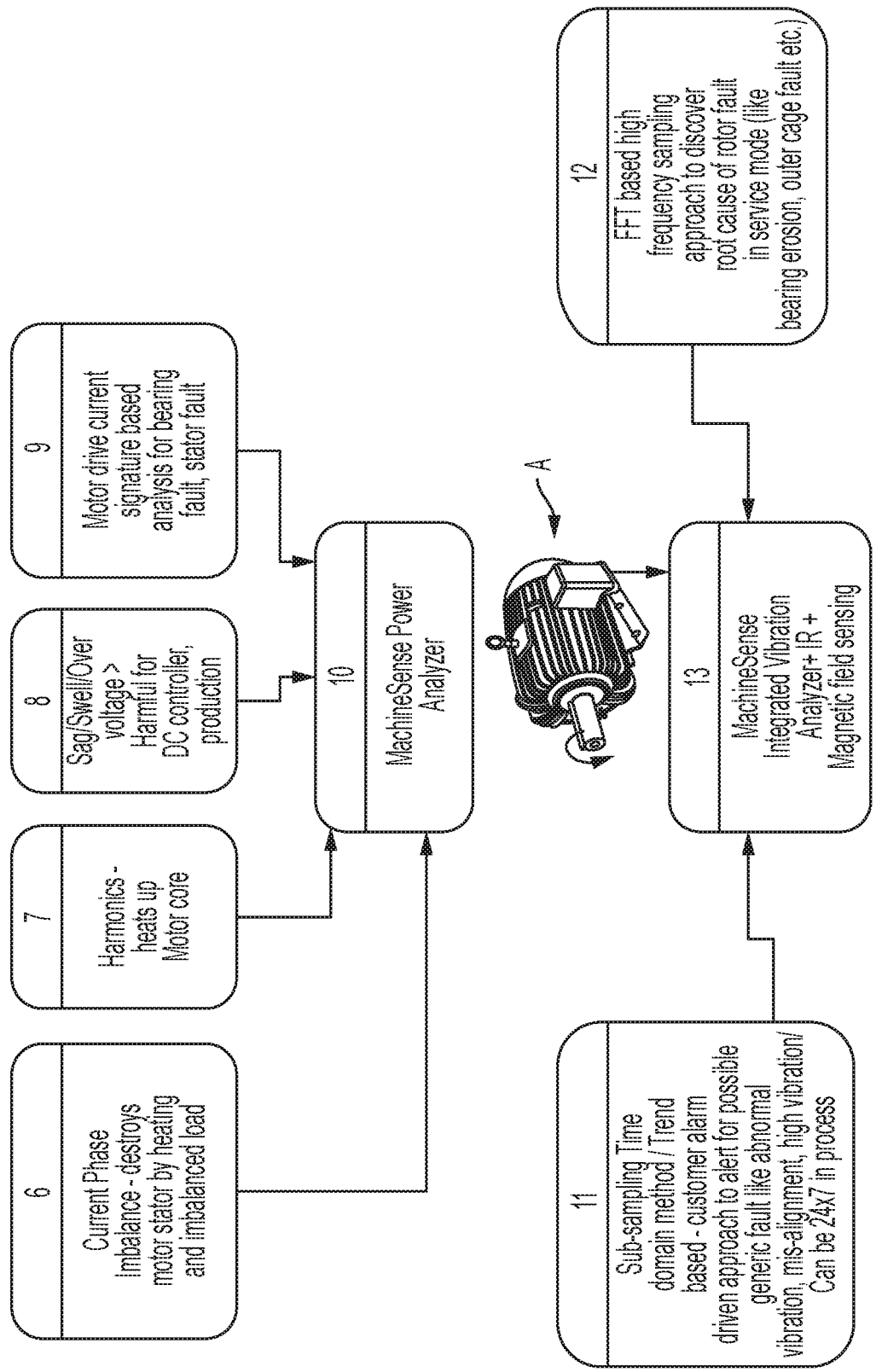
FIG. 2 is a schematic representation of a method for determining root causes of turbomachinery failures in accordance with aspects of the invention.

FIG. 2 schematically shows a method in accordance with the invention for determination of root causes of turbomachine failures using a fast Fourier transfer enabled frequency domain technique and a power quality analyzer device performing analysis of incoming power sag/swell, harmonic, overvoltage, noise, and the like. Abnormality of any of these parameters results in heat-up of the coils of the motor of the turbomachine indicated A in FIG. 2. Parameters such as sag/swell, harmonics, over-voltage and noise, if present in the power input to the motor of turbomachine A illustrated schematically in FIGS. 1 and 2, in addition to heating the motor coil also distorts the magnetic field of the coil. The sensor used to extract time domain data is preferably a multi-sensor that can sense vibration, magnetic field presence and strength, temperature, infrared radiation, and various parameters of the input power, namely voltage, current, and phase characteristics.

The adverse effects of poor power quality can be detected form presence of infrared radiation, which is a marker for increased motor coil temperature, and perturbation of the magnetic field. As illustrated schematically in FIG. 2, data analytics determine the possible root cause of turbomachine degradation, which can be poor power quality detected in a power quality analyzer, or abusive operation, which leads to undesirable vibration, which degradation can be further detected by time domain and frequency domain analysis; the effect of which is manifest in long term decay of bearings and motor coils.

All of this is indicated in FIG. 2 schematically where blocks 6 through 9 schematically illustrate input power, current and voltage anomalies that lead to degraded turbomachine performance and eventually to failure of the turbomachine. Current phase imbalance, which may destroy the motor stator by heating it, resulting in unbalanced loading, is depicted in block 6. Block 7 schematically illustrates that harmonics in the input power heat the motor coil. Block 8 schematically illustrates that sag or swell, or over-voltage in the input current to the motor, are harmful to a motor controller. Block 9 illustrates schematically that motor drive current signature, based on analysis, provides indications of bearing fault and of stator fault. All of these data and the associated information are sensed by the power analyzer as indicated schematically by block 10 in FIG. 2.

Still referring to FIG. 2, block 11 schematically depicts that subsampling of time domain data produces trend information leading to a customer alarm driven approaches for alerting personnel to possible faults such as abnormal vibration frequencies, rotor misalignment and high vibration amplitude. This time domain sampling can be a 24×7 operation.

Block 12 in FIG. 2 schematically depicts the fast Fourier transform based high frequency sampling approach used to discover the root cause of rotor fault such as bearing erosion, bearing outer cage fracture, and the like. All of this data is provided to the integrated vibration analyzer for infrared and magnetic field sensing and analysis as indicated schematically by block 13 in FIG. 2. The result is a robust and more comprehensive model of turbomachine motor maintenance and determination of root cause of failure made possible by combining time and frequency domain analysis of vibration, detection of the magnetic field, radiation temperature, and analysis of incoming power quality for harmonic, noise, and phase imbalance.

In the resulting analysis performed by the system and methods of the invention, if turbomachine performance anomalies or degradation is apparent from the long term analysis of vibration, typically and desirably conducted in the time domain, the root cause of the degradation is then diagnosed by (i) the frequency domain analysis of the vibration data in combination with, (ii) additional sensing of magnetic field and radiation temperature, and further considering the effects of (iii) the quality of incoming power harmonics, noise and current and voltage phase imbalance. By combining these methods and analyses, accurate identification of the root cause of degradation of the turbomachinery results.

Figure 3:
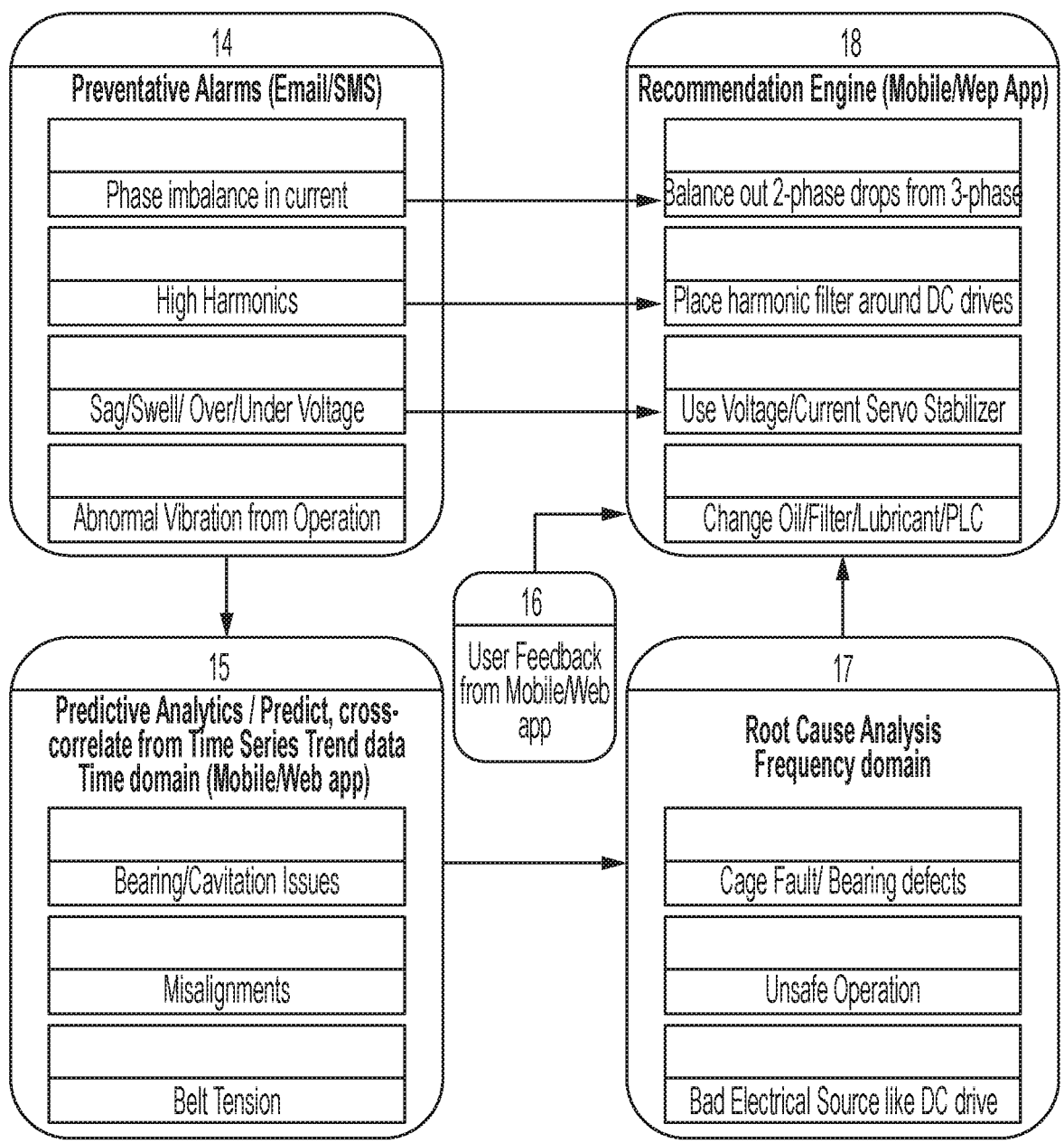
FIG. 3 is a schematic representation of information flow in the context of systems and methods for determining root causes of turbomachinery failures in accordance with the invention, resulting in a tabulated, identified, root cause of turbomachinery failures and a recommendation display for eliminating the same.

FIG. 3 illustrates informational flows involved in the practice of the methods and systems of the invention, by which the invention is preferably implemented. Referring to FIG. 3, block 14 illustrates schematically the preventive alarms that are found from the analysis illustrated in FIGS. 1 and 2 and further illustrates that those preventive alarms, and the information associated therewith, go to the recommendation engine illustrated schematically as block 18 in FIG. 3, which desirably provides a user friendly display of the result of the analysis of the preventive alarms from block 14 and the other blocks illustrated in FIG. 3. Block 15 in FIG. 3 is indicative of the predictive analytics in schematic form, where the predictive analytics are cross-correlated with time series trend data and time domain data. These data collectively typically indicate bearing or cavitation issues, misalignment of the rotor, and belt tension issues, all of which will eventually lead to failure of the turbomachine.

This information and data is provided to the root cause frequency domain procedure analysis illustrated schematically in block 17 where Fourier transforms are indicated to be performed on data to indicate cage or bearing defects resulting in unsafe operation of the turbomachine, and further indicating poor quality of electrical power incoming to the motor of the turbomachine. The results of the root cause analysis and the frequency domain analytics, as indicated in schematic block 17, are provided to block 18 as indicated in FIG. 3. Block 18 also receives user feedback, preferably from a mobile or web application device, and combines all of this information to produce a visible readout and visible and audible alarms with respect to operation of the turbomachine. This information is then be used to stop the machine before there is a catastrophic failure or to take other remedial steps, such as reducing the speed of the motor, stopping the motor intermittently, lubricating the bearings and rotor of the turbomachine, and the like.

Although schematic implementations of present invention and at least some of its advantages are described in detail hereinabove, it should be understood that various changes, substitutions and alterations may be made to the apparatus and methods disclosed herein without departing from the spirit and scope of the invention as defined by the appended claims. The disclosed embodiments are therefore to be considered in all respects as being illustrative and not restrictive with the scope of the invention being indicated by the appended claims rather than by the foregoing description. All changes which come within the meaning and range of equivalency of the claims are therefore intended to be embraced therein. Moreover, the scope of this patent application is not intended to be limited to the particular implementations of apparatus and methods described in the specification, nor to any methods that may be described or inferentially understood by those skilled in the art to be present as described in this specification.

As disclosed above and from the foregoing description of exemplary embodiments of the invention, it will be readily apparent to those skilled in the art to which the invention pertains that the principles and particularly the compositions and methods disclosed herein can be used for applications other than those specifically mentioned. Further, as one of skill in the art will readily appreciate from the disclosure of the invention as set forth hereinabove, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for operation of the invention."

Further respecting the claims, the terms "means" and "means for" denote the structure for performing the recited function and all equivalents thereto performing substantially the same function in substantially the same way to achieve the same or essentially the same result, as would be readily recognized by one of skill in this technology and art.

The scope of the invention is, therefore, indicated by the appended claims rather than by the foregoing description and all changes which come within the range of equivalency of the claims are to be considered to be embraced within the scope of the claims. Additional objects, other advantages, and further novel features of the invention will become apparent from study of the appended claims as well as from study of the foregoing detailed discussion and description of the preferred embodiments of the invention, as that study proceeds.

The following is claimed:

1. A method for determining failure causes in electrically powered machinery, comprising:
   a) sensing physical parameters, in the course of operation of the machine;
   b) providing data indicative of the sensed physical parameters to a processor;
   c) processing the data by selecting a parameter data sample and extracting metadata for selected characteristics of the sensed physical parameters from the data;
   d) monitoring the data and performing trend analysis thereon for the selected parameter characteristics; and
   e) upon detecting a preselected amount of deviation of a selected characteristic in the monitored data from a preselected value, sampling the metadata for a preselected time interval and then analyzing the selected parameter characteristic relative to a preselected base value to detect a cause of failure in the turbomachine according to any variation of the sensed parameter from the base value.

2. A system for determining causes of failures in electrically powered machinery, comprising:
 a) means for sensing machine and input power physical parameters in the course of machine operation and providing output data indicative of the sensed physical parameters;
 b) communication means wirelessly connected to the sensing means for receiving the output data therefrom;
 c) first computing means wirelessly connected to the communication means for receiving the output data therefrom and processing the data by selecting a sensed physical parameter data sample size and duration to be within the processing capacity of the computing means and thereafter extracting metadata for selected characteristic(s) of the sensed parameter(s) from the processed data; and
 d) edge cloud computing means, wirelessly connected to the first computing means via the communication network, receiving the processed data and the metadata, for continuously monitoring and performing trend analysis on the data for selected parameter characteristics and upon detecting deviation of a selected characteristic in the data from a preselected value, sampling the metadata for a preselected time interval and analyzing a selected parameter characteristic according to preselected algorithm to detect a cause of failure in the turbomachinery as a variation of the parameter from the base value.

3. A system for identifying causes of vibration induced failures in electrically powered machinery, comprising:
 a) means connected to an electric motor powering the machinery for providing time domain output data indicative of sensed vibration parameters;
 b) communication means connected to the data providing means and receiving the output time domain data therefrom;
 c) first edge cloud computing means connected to the communication means, receiving the output data therefrom, for processing the time domain data by selecting a data sample of preselected size and duration and extracting metadata for selected vibration parameters from transformed data;
 d) second edge cloud computing means wirelessly connected to the first edge cloud computing means via the communication means, receiving the metadata for continuously monitoring and performing trend analysis on the metadata for selected characteristics indicative of status of the vibration parameters; and
 upon detecting variance of the selected characteristic in the time domain data from a preselected value, analyzing the sampled metadata for the selected characteristics according to a preselected algorithm to detect a cause of a vibration induced machinery failure from deviations of the characteristics from base values.

4. A method for predicting maintenance needs, analyzing preventative maintenance requirements and determining causes of failure in power machinery, comprising:
 a) wirelessly connecting multi-parameter sensing means having microcomputing means as a component thereof, to the machine;
 b) wirelessly connecting power quality sensing means having microcomputing means as a component thereof to an electrical line providing power to the machine;
 c) wirelessly transmitting data from the multi-parameter sensing means and data from the power quality sensing means to computing means connected to the cloud via the Internet;
 d) providing data indicative of sensed physical parameters to the computing means;
 e) processing the data by selecting sensed physical parameter data samples and extracting metadata for selected characteristics of the sensed physical parameters from the data samples;
 f) continuously monitoring the sensed data and performing trend analysis thereon for selected characteristics of physical parameters; and
 g) upon detecting deviation of a selected characteristic data from a preselected value, sampling metadata for the selected characteristic for a selected time interval and then analyzing the selected parameter characteristic data according to an algorithm to detect as a cause of failure in the machine any variation of the parameter from a base value.

5. The method of claim 4 wherein the output data further comprises collected vibration data and the method further comprises:
 a) analyzing the collected vibration data to determine a long term trend of at least one vibration parameter;
 b) correlating the resulting vibration parameter long term trend with different kinds of machine failures;
 c) using the results of the correlation to generate an early indication of machine degradation to operators; and
 d) providing the results of the correlation to the multi-parameter sensing means and to the power quality sensing means for subsequent computation thereby.

6. The method of claim 5 further comprising performing Fourier transform-based analysis on successive batches of collected data to ascertain causes of machine failure until computed error is reduced to within an acceptable statistical limit.

7. The method of claim 6 further comprising in the edge or public cloud, correlating the parameter data for harmonics and applying frequency domain analysis thereto to isolate an exact cause of degradation of machine performance.

8. The method of claim 7 further comprising:
 a) in the edge or public cloud further correlating the result obtained by correlating the parameter data for harmonics with temperature and magnetic field data;
 b) applying frequency domain analysis thereto;
 c) accepting use data furnished by a mobile/web feedback device and a rule-based and/or machine learning based recommendation engine to define appropriate degradation mitigation steps; and
 d) wirelessly furnishing those steps to a third party customer respecting the machine.

* * * * *